US011917546B2

(12) United States Patent
Dusenberry et al.

(10) Patent No.: US 11,917,546 B2
(45) Date of Patent: Feb. 27, 2024

(54) TECHNIQUES FOR PRESERVING BATTERY LIFE IN POOR SIGNAL CONDITIONS USING CELLULAR PROTOCOL INFORMATION

(71) Applicant: ITRON, INC., Liberty Lake, WA (US)

(72) Inventors: Robert Vernon Dusenberry, Newman Lake, WA (US); Richard Donald Maes, II, Liberty Lake, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 17/750,186

(22) Filed: May 20, 2022

(65) Prior Publication Data
US 2022/0286968 A1 Sep. 8, 2022

Related U.S. Application Data

(63) Continuation of application No. 17/127,463, filed on Dec. 18, 2020, now Pat. No. 11,638,215.

(51) Int. Cl.
*H04W 52/02* (2009.01)
*H04W 24/08* (2009.01)
(Continued)

(52) U.S. Cl.
CPC ....... *H04W 52/0245* (2013.01); *H04W 24/08* (2013.01); *H04W 72/542* (2023.01);
(Continued)

(58) Field of Classification Search
CPC . H04W 52/00; H04W 52/02; H04W 52/0209; H04W 52/0225; H04W 52/0245;
(Continued)

(56) References Cited

U.S. PATENT DOCUMENTS 10,375,642 B2   8/2019   Cornwall et al.
11,418,619 B1*  8/2022   Mattison ........... H04W 52/0216
(Continued)

FOREIGN PATENT DOCUMENTS

EP   2 670 069 A1   12/2013
EP   3 217 714 A1   9/2017
(Continued)

OTHER PUBLICATIONS

Mehmood et al., "Power Consumption Modeling of Discontinuous Reception for Cellular Machine Type communications", doi: 10.3390/s19030617, Feb. 1, 2019, 17 pages.
(Continued)

*Primary Examiner* — Siu M Lee
(74) *Attorney, Agent, or Firm* — Artegis Law Group, LLP

(57) ABSTRACT

Techniques for preserving battery life in poor signal conditions include an electronic device determining a coverage enhancement (CE) parameter associated with a link between the electronic device and a base station for a first point in time; determining, based on the CE parameter, that a signaling metric associated with the link for the first point in time is equal to or below a corresponding threshold; and in response to determining that the signaling metric is equal to or below the corresponding threshold, delaying transmission of one or more messages from the electronic device over the link until a second point in time that is later than the first point in time.

18 Claims, 6 Drawing Sheets

(51) Int. Cl.
*H04W 72/542* (2023.01)
*G16Y 10/35* (2020.01)
*G16Y 30/00* (2020.01)
*G16Y 20/30* (2020.01)

(52) U.S. Cl.
CPC .............. *G16Y 10/35* (2020.01); *G16Y 20/30* (2020.01); *G16Y 30/00* (2020.01)

(58) Field of Classification Search
CPC ..... H04W 24/00; H04W 24/02; H04W 24/04; H04W 24/06; H04W 24/08; H04W 72/12; H04W 72/1226; H04W 72/1231; G16Y 30/00; G16Y 10/35; G16Y 20/30
See application file for complete search history.

(56) References Cited

U.S. PATENT DOCUMENTS

| | | | |
|---|---|---|---|
| 11,638,215 B2* | 4/2023 | Dusenberry | H04W 52/0245 455/423 |
| 2007/0298822 A1 | 12/2007 | Wan et al. | |
| 2012/0250538 A1* | 10/2012 | Su | H04W 52/028 370/252 |
| 2013/0266024 A1 | 10/2013 | Schoppmeier | |
| 2014/0169281 A1 | 6/2014 | Wang et al. | |
| 2015/0055594 A1 | 2/2015 | Nirantar et al. | |
| 2016/0228069 A1 | 8/2016 | Derkx et al. | |
| 2017/0074752 A1 | 3/2017 | Pitwon | |
| 2018/0220373 A1 | 8/2018 | Arzelier et al. | |
| 2018/0234920 A1 | 8/2018 | Bae | |
| 2018/0359708 A1 | 12/2018 | Zhao et al. | |
| 2018/0376427 A1* | 12/2018 | Arzelier | H04W 28/0268 |
| 2019/0046037 A1 | 2/2019 | Ramesh et al. | |
| 2019/0055835 A1 | 2/2019 | Brookes et al. | |
| 2019/0245647 A1 | 8/2019 | Alieiev et al. | |
| 2019/0320491 A1 | 10/2019 | Shukair et al. | |
| 2020/0112916 A1 | 4/2020 | Dusenberry | |
| 2020/0252809 A1 | 8/2020 | Patil et al. | |
| 2020/0396625 A1 | 12/2020 | Sethuraman et al. | |
| 2021/0144734 A1* | 5/2021 | Rashid | H04W 72/1263 |
| 2021/0216906 A1 | 7/2021 | Flores et al. | |
| 2021/0219144 A1* | 7/2021 | Schwengler | H04W 48/14 |
| 2021/0385753 A1 | 12/2021 | Kontio et al. | |
| 2022/0124781 A1* | 4/2022 | Meylan | H04W 76/28 |
| 2022/0132622 A1 | 4/2022 | Ahn et al. | |
| 2022/0210788 A1 | 6/2022 | Dutta et al. | |

FOREIGN PATENT DOCUMENTS

| | | |
|---|---|---|
| WO | 2018/138382 A1 | 8/2018 |
| WO | 2018/192310 A1 | 10/2018 |

OTHER PUBLICATIONS

RF Wireless World, "Home of RF and Wireless Vendors and Resources", https://www.rfwireless-world.com/terminology/Difference-between-PSM-and-eDRX-in-GSM-LTE-M-NB-IoT.html, 7 pages.
Non Final Office Action received for U.S. Appl. No. 17/127,463 dated Jun. 24, 2022, 14 pages.
Extended European Search Report for Application No. 21214199.8 dated May 17, 2022.
Extended European Search Report for Application No. 21214198.0 dated May 13, 2022.
Liu et al., "Coverage Enhancement and Fundamental Performance of 5G: Analysis and Field Trial", DOI:10.1109/MCOM.2019.1800543, vol. 57, No. 6, Jun. 2019, pp. 126-131.
Andres-Maldonado et al., "An Analytical Performance Evaluation Framework for NB-Iot", DOI:10.1109/JIOT.2019.2915349 , vol. 6, No. 4, Aug. 2019, pp. 7232-7240.
Notice of Allowance received for U.S. Appl. No. 17/127,463 dated Dec. 21, 2022, 10 pages.
Final Office Action received for U.S. Appl. No. 17/127,463 dated Oct. 11, 2022, 20 pages.
Non Final Office Action received for U.S. Appl. No. 17/571,389 dated Feb. 8, 2023, 43 pages.
Final Office Action received for U.S. Appl. No. 17/571,389 dated Jun. 29, 2023, 12 pages.
Notice of Allowance received for U.S. Appl. No. 17/571,389 dated Aug. 21, 2023, 9 pages.
Extended European Search Report for Application No. 23161176.5 dated Jul. 31, 2023.

* cited by examiner

TECHNIQUES FOR PRESERVING BATTERY LIFE IN POOR SIGNAL CONDITIONS USING CELLULAR PROTOCOL INFORMATION

CROSS-REFERENCE TO RELATED APPLICATIONS

The present application is a continuation of United States application titled "TECHNIQUES FOR PRESERVING BATTERY LIFE IN POOR SIGNAL CONDITIONS USING CELLULAR PROTOCOL INFORMATION," filed on Dec. 18, 2020, and having Ser. No. 17/127,463. The subject matter of this related application is hereby incorporated herein by reference.

BACKGROUND

Field of the Various Embodiments

Embodiments of the present disclosure relate generally to preserving battery life in electronic devices, and more specifically, to techniques for preserving battery life in poor signal conditions using cellular protocol information.

DESCRIPTION OF THE RELATED ART

A conventional utility distribution infrastructure typically includes multiple consumers (e.g., houses, business, etc.) coupled to a set of intermediate distribution entities. The distribution entities draw resources from upstream providers and distribute the resources to the downstream consumers. In a modern utility distribution infrastructure, the consumers and/or intermediate distribution entities may include Internet-of-Things (IoT) devices, such as smart utility meters and other network-capable hardware. These IoT devices measure resource consumption to generate related metrology data and periodically report the metrology data across the Internet or other network to a centralized management facility, often referred to as the "back office."

In many cases, the back office performs various management operations for the utility distribution infrastructure on behalf of one or more customers. For example, a customer could include a utility company or another corporate entity that owns and/or operates all of or part of the utility distribution infrastructure. Typically, the back office periodically collects metrology data associated with the utility distribution infrastructure and provides that data to customers. For example, the back office could obtain metrology data from a set of IoT devices every eight hours indicating utility consumption over an eight-hour interval. The back office also occasionally initiates on-demand read requests to read metrology data from one or more specific IoT device at the behest of the customer. For example, the customer could require a final utility meter reading from a smart utility meter located at a recently sold residence to prorate a utility bill. In such a situation, the back office would transmit an on-demand read request to that smart meter to cause the smart meter to report the current meter reading.

Some types of IoT devices are designed to establish communication links and connect to the Internet or to another network via cellular modems that communicate via a cellular network. For example, an IoT device could be configured with a narrow-band IoT (NB-IoT) modem that couples to a cellular network according to an NB-IoT protocol. In such a case, the NB-IoT modem would allow the IoT device to establish a cellular link with a nearby cellular tower and then access the Internet or another network via that cellular tower. Generally speaking, one benefit of communicating over cellular links, especially those implemented via the NB-IoT protocol, is that IoT devices can connect to the Internet or to another network quickly. Another benefit is that cellular links allow IoT devices to perform secure, Internet protocol (IP) based communications. Accordingly, customers oftentimes prefer that IoT devices communicate with the back office via cellular links, as opposed to other type of communications channels. In that regard, cellular links allow IoT devices to report metrology data more frequently, and cellular links allow back offices to perform on-demand read requests with IoT devices with relatively low latency.

One drawback of the above approach is that establishing and maintaining a cellular link typically consumes a significant amount of power. However, to properly report metrology data regularly, in the manner describe above, an IoT device must establish a cellular link quite frequently (e.g., once every eight hours). Thus, battery-powered IoT devices usually cannot communicate via cellular links with requisite frequency without substantially reducing expected battery life. Further, cellular signal strength or connectivity can be negatively impacted by numerous factors, including and without limitation, obstructions (e.g., vehicles, debris, etc.) between a given device and a cellular base station, connections between other devices and the cellular base station, weather conditions near the device and/or cellular base station, and interference with other wireless signals. In poor signal conditions, a given device oftentimes repeatedly attempts to resend the same messages until acknowledgements for the messages are received, where each unsuccessful attempt increases the power consumed by that device and reduces the effective data rate of the communication link between the device and the cellular base station.

Smart meters and other battery-powered IoT devices usually are designed with an expected battery life of 15-20 years. However, establishing frequent cellular links and/or repeatedly retrying message transmissions during poor signaling conditions can reduce expected battery life to one year or less. When the depleted batteries in a battery-powered IoT device need to be replaced, a truck has to be dispatched, and a service person has to replace the depleted batteries manually, which can substantially increase operating overhead.

As the foregoing illustrates, what is needed in the art are more effective techniques for conserving battery life in battery-powered network devices.

SUMMARY

One embodiment of the present invention sets forth a technique for operating an electronic device within a cellular environment. The technique includes determining a coverage enhancement (CE) parameter and one or more radio frequency (RF) link parameters associated with a link between the electronic device and a cellular base station at a first point in time. The technique also includes computing a first estimate for a signal condition associated with the link based on the CE parameter and the one or more RF link parameters. The technique further includes determining that the signal condition is not adequate based on the first estimate and delaying transmission of one or more messages from the electronic device over the link until a second point in time that is later than the first point in time.

One technical advantage of the disclosed techniques relative to the prior art is that the disclosed techniques, when implemented in battery-powered network devices, enable relatively higher success rates and/or reduced retry rates when transmitting data over cellular links. Accordingly, the disclosed techniques enable battery-powered devices to reduce overall power consumption relative to what can be achieved using prior art approaches, thereby extending overall battery life. In addition, the disclosed techniques reduce overall computational overhead and result in overall higher data rates in cellular communications. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
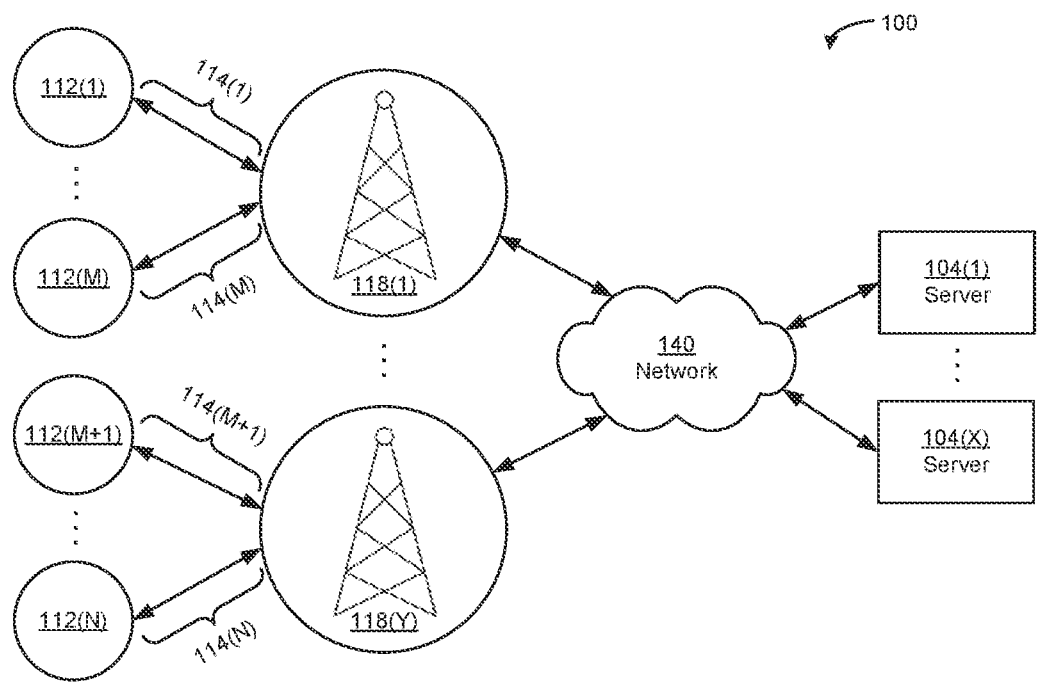
FIG. 1 illustrates a network system configured to implement one or more aspects of the various embodiments.

FIG. 1 illustrates a network system 100 configured to implement one or more aspects of various embodiments. As shown, network system 100 includes a number of servers 104(1)-104(X), each of which is referred to individually as a server 104. Network system 100 also includes a number of cellular base stations 118(1)-118(Y) (e.g., cell sites, cellular towers, etc.), each of which is referred to individually as base station 118.

Base stations 118 are capable of communicating with servers 104 via a network 140. Network 140 includes any technically feasible wired, optical, wireless, or hybrid network that transmits data between or among servers 104, base stations 118, and/or other components. For example, network 140 could include a wide area network (WAN), local area network (LAN), personal area network (PAN), wireless (WiFi) network, cellular network, Ethernet network, Bluetooth network, universal serial bus (USB) network, satellite network, and/or the Internet.

Network system 100 also includes a set of electronic devices 112(1)-112(M) connected to base station 118(1) via a set of cellular links 114(1)-114(M), as well as a different set of electronic devices 112(M+1)-112(N) connected to base station 118(Y) via a different set of cellular links 114(M+1)-114(N). For example, each electronic device included in electronic devices 112(1)-112(M) and electronic devices 112(M+1)-112(N) could establish a cellular link with the closest base station 118 and/or a given base station 118 for the cell in which the electronic device is located. Each of electronic devices 112(1)-112(M) and electronic devices 112(M+1)-112(N) is referred to individually as electronic device 112.

Electronic devices 112 include network-enabled devices that use a cellular communication protocol to establish and maintain cellular links 114 with cellular base stations 118. In one embodiment, the cellular communication protocol includes the narrow-band Internet-of-Things (NB-IoT) protocol. A given electronic device 112 establishes a cellular link using a cellular modem, as described below in greater detail in conjunction with FIG. 2. In so doing, the given electronic device 112 transmits identifying information included in a subscriber identification module (SIM) card to a carrier server (not shown) via a corresponding cellular tower 118. In response, the carrier server authorizes the given electronic device 112 to establish a cellular link 114 with the corresponding cellular tower 118.

AppEach server 104 represents a destination for data generated by electronic devices 112. Electronic devices 112 generally transmit this data to servers 104 via a cellular network that includes base stations 118 for security and reduced latency. For example, electronic devices 112 could generate electricity consumption data and/or other metrology data and transmit the metrology data to servers 104 across cellular links 114.

Electronic devices 112 establish cellular links 114 periodically and/or at different times according to a communication schedule defined by servers 104 and/or other components of network system 100. For example, each electronic device 112 could be scheduled to establish a corresponding cellular link 114 at a different hour of a given day, so that only a subset of cellular links 114 are active at a given time. Each electronic device 112 may establish cellular link 114 at a certain frequency (e.g., every eight hours, every 24 hours, etc.) to transmit data collected over the preceding period to one or more servers 104. When cellular link 114 is not established for a given electronic device 112 (e.g., during periods in between transmission times specified in the communication schedule), the cellular modem on the electronic device may be placed in a lower-power "sleep" mode to conserve power.

A given electronic device 112 that establishes a cellular link 114 with a corresponding base station 118 may then exchange data with one or more servers 104 via link 114. For example, electronic devices 112 could include smart meters that measure and report consumption of electricity and/or other resources to servers 104 in a centralized management facility and/or "back office" for the corresponding utility. In another example, electronic devices 112 could monitor and report particulate matter mass concentrations and/or other indicators of air quality to servers 104 for one or more governmental, private, and/or other entities that analyze and/or aggregate air quality data from multiple locations. In general, electronic devices 112 may include devices that measure, collect, and/or transmit data in a non-real-time manner to servers 104 via cellular links 114 with base stations 118.

Each electronic device 112 can be powered by one or more power sources, such as (but not limited to) a power grid, a battery, and/or a solar panel. When a given electronic device 112 is battery-powered, electronic device 112 may perform a number of operations to reduce power consumption. As described in further detail below, these operations may include analyzing and/or evaluating cellular protocol and/or radio frequency (RF) parameters associated with the electronic device's link 114 with a corresponding base station 118. When the parameters meet one or more conditions and/or thresholds indicating that the signal over link 114 can be used to establish a data session with base station 118, the electronic device may transmit messages that include metrology and/or other data collected by the electronic device over link 114 to base station 118 for forwarding to the relevant servers 104. When the parameters do not meet the conditions and/or thresholds, the electronic device may delay transmission of the messages over link 114 for a predetermined period and/or until the corresponding link 114 has sufficient signal strength.

Figure 2:
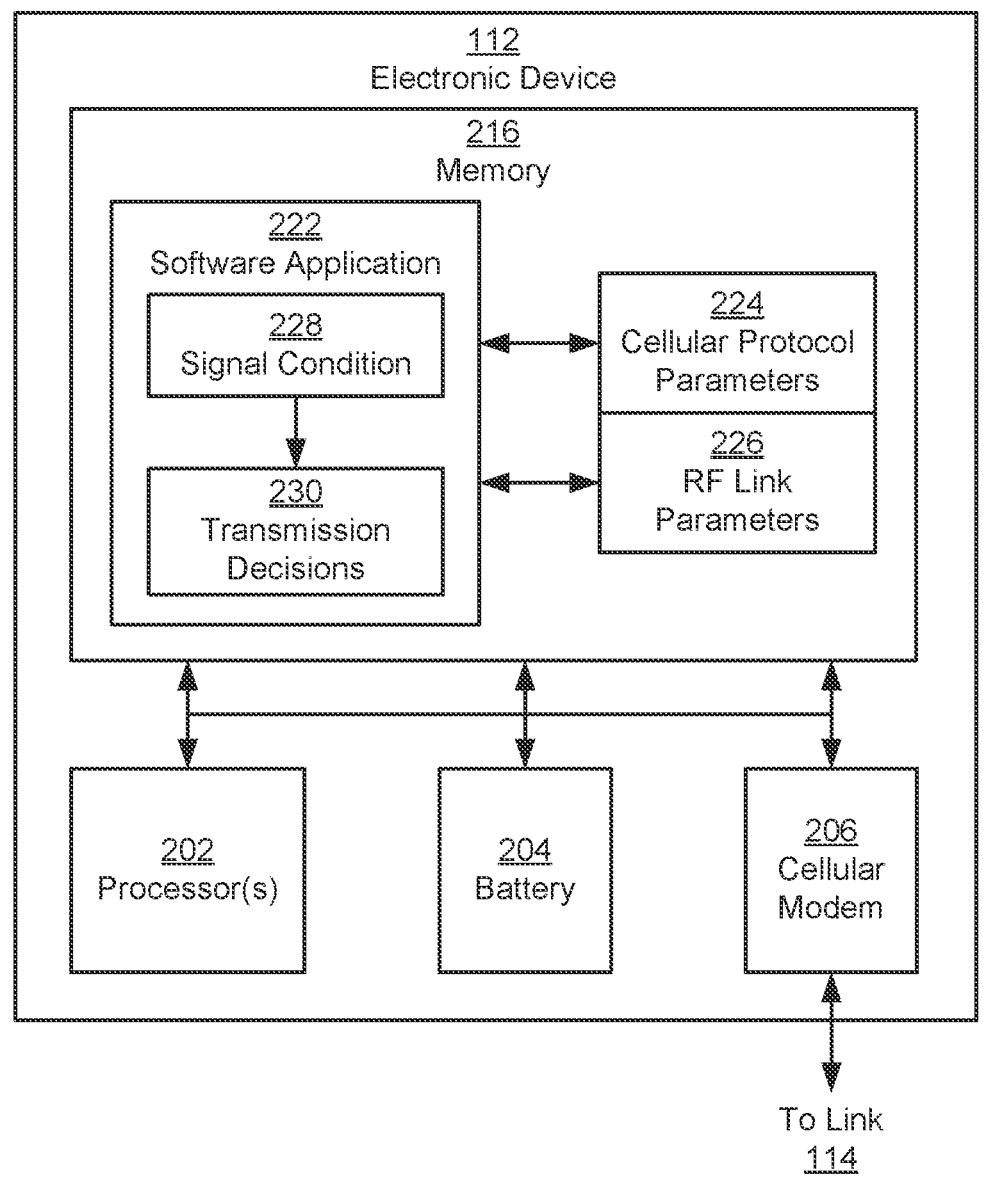
FIG. 2 is a more detailed illustration of one of the electronic devices of FIG. 1, according to various embodiments.

FIG. 2 is a more detailed illustration of one of electronic devices 112 of FIG. 1, according to various embodiments. As shown, electronic device 112 includes one or more processors 202, a battery 204, a cellular modem 206, and a memory 216 coupled together.

Processors 202 include any technically feasible hardware units configured to process data and execute software applications (e.g., software application 222). For example, processors 202 could include one or more central processing units (CPUs), graphics processing units (CPUs), application-specific integrated circuit (ASICs), field programmable gate array (FPGAs), artificial intelligence (AI) accelerators, microprocessors, microcontrollers, other types of processing units, and/or a combination of different processing units (e.g., a CPU configured to operate in conjunction with a GPU).

Memory 216 includes one or more units that store data and/or instructions. For example, memory 216 could include a random access memory (RAM) module, a flash memory unit, and/or another type of memory unit. Processors 202, cellular modem 206, and/or other components of electronic device 112 include functionality to read data from and write data to memory 116. Memory 216 includes software application 222, which includes program code that, when executed by one or more processors 202, performs any of the operations discussed herein.

Cellular modem 206 establishes a cellular link 114 between electronic device 112 and a corresponding base station 118. For example, cellular modem 206 could include a narrow-band IoT (NB-IoT) modem that establishes link 114 with base station 118 and couples to a cellular network according to an NB-IoT protocol. Once link 114 is established, electronic device 112 may use cellular modem 206 and link 114 to connect to the Internet and/or another network (e.g., network 140) and send and receive data with other devices on the network.

Battery 204 supplies power to processors 202, cellular modem 206, memory 216, and/or other components of electronic device 112. For example, battery 204 could include sufficient capacity to allow electronic device 112 to operate for a number of years without replacement and/or recharging.

Software application 222 manages battery 204 consumption on electronic device 112 by controlling the transmission of data over link 114 based on estimates of a signal condition 228 associated with link 114. In some embodiments, signal condition 228 represents the ability of electronic device 112 to transmit and/or receive data using the signal associated with link 114. A "good" signal condition 228 indicates that the signal can be used to transmit data over link 114, while a "poor" signal condition 228 indicates that the signal is not capable of transmitting data over link 114 without encountering interruptions, retries, and/or other issues or errors. Signal condition 228 may be affected by obstructions (e.g., vehicles, debris, etc.) between electronic device 112 and base station 118, connections between other devices and base station 118, weather conditions near electronic device 112 and/or base station 118, and/or other factors. Signal condition 228 may be estimated by measuring, assessing, and/or combining signal strength, signal quality, and/or other attributes that characterize the signal.

More specifically, software application 222 may estimate signal condition 228 based on one or more cellular protocol parameters 224 and/or one or more RF link parameters 226 associated with link 114. When cellular protocol parameters 224 and/or RF link parameters 226 indicate signal condition 228 is adequate for transmitting and/or receiving data, software application 222 may make and/or implement transmission decisions 230 that cause data to be transmitted over link 114. When cellular protocol parameters 224 and/or RF link parameters 226 indicate that signal condition 228 is not adequate, software application 222 may make and/or implement transmission decisions 230 that cause the transmission of data over link 114 to be delayed.

In one or more embodiments, software application 222 analyzes cellular protocol parameters 224 to assess signal condition 228 and make transmission decisions 230. As described in further detail below with respect to FIG. 3A, cellular protocol parameters 224 may include (but are not limited to) a coverage enhancement (CE) parameter, a Signal to Interference and Noise Ratio (SINR), and/or a Reference Signal Received Quality (RSRQ) provided by the cellular modem 206 and/or the cellular protocol associated with link 114. Software application 222 may perform one or more comparisons, evaluations, and/or other operations using cellular protocol parameters 224 to generate a binary value indicating whether or not signaling condition 228 is adequate (e.g., whether electronic device 112 is inside or outside the cell edge associated with the corresponding base station 118).

Software application 222 also, or instead, uses protocol-agnostic RF link parameters 226 to estimate signal condition 228 and make corresponding transmission decisions 230. As described in further detail below with respect to FIG. 3B, RF link parameters 226 may include (but are not limited to) a path loss (PL), a Reference Signal Received Power (RSRP), and/or a SINR. Software application 222 may input RF link parameters 226 into one or more equations and/or formulas and obtain, as output from the equation(s) and/or formula(s), a numeric value representing signal condition 228. A change in the numeric value indicates an increase or decrease in signal condition 228. As a result, the numeric value may represent a "probability" of successful data transmission over link 114, given the current state of the signal associated with link 114.

Preserving Battery Life When Poor Signaling Conditions Exist

Figure 3A:
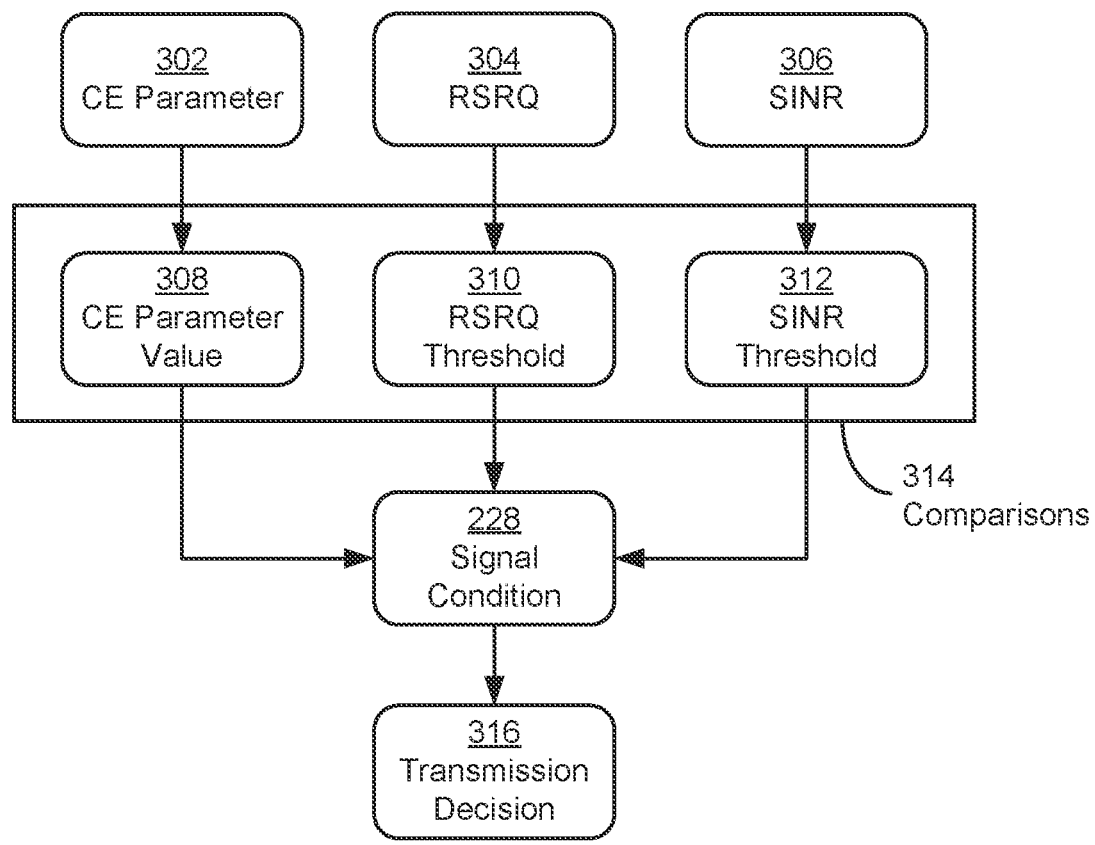
FIG. 3A illustrates the use of the cellular protocol parameters of FIG. 2 when making a transmission decision, according to various embodiments.

FIG. 3A illustrates the use of cellular protocol parameters 224 of FIG. 2 in making a transmission decision 316, according to various embodiments. As mentioned above, cellular protocol parameters 224 may be provided and/or supported by the cellular protocol used by an electronic device (e.g., electronic device 112 of FIG. 1) to establish a link with a cellular base station (e.g., base station 118 of FIG. 1).

As shown in FIG. 3A, cellular protocol parameters 224 include a CE parameter 302, an RSRQ 304, and a SINR 306. CE parameter 302 includes a CE level, CE mode, and/or another value indicating the amount of CE on the electronic device. For example, CE parameter 302 may represent a number of retries, power boosting, and/or the use of other CE techniques by the electronic device in the presence of adverse signal conditions.

RSRQ 304 and SINR 306 include metrics related to signal strength and/or signal quality provided by a cellular modem (e.g., cellular modem 206 of FIG. 2) on the electronic device. For example, measurements of RSRQ 304 and SINR 306 may be generated according to one or more cellular protocols and/or one or more propagation models supported by the cellular modem.

A number of comparisons 314 are performed using CE parameter 302, RSRQ 304, and SINR 306 to generate an estimate of signal condition 228 for the link between the electronic device and base station. In particular, comparisons 314 may include a comparison of CE parameter 302 with a predetermined CE parameter value 308, a comparison of RSRQ 304 with an RSRQ threshold 310, and a comparison of SINR 306 with a SINR threshold 312.

For example, comparisons 314 could be performed using the following expression:

$$(\text{CE level}==0) \&\& (\text{SINR} > \text{SINR threshold}) \&\& (\text{RSRQ} > \text{RSRQ threshold}) \quad (1)$$

The expression includes a first comparison of CE parameter 302 with a CE level of 0, which indicates a lowest number of data transmission retries over the link. The first comparison evaluates to true if CE parameter 302 is set to or represents the CE level of 0 and to false otherwise. The expression also includes a second comparison of SINR 306 to SINR threshold 312 and a third comparison of RSRQ 304 to RSRQ threshold 310. The second comparison evaluates to true if SINR 306 exceeds SINR threshold 312 and to false otherwise, and the third comparison evaluates to true if RSRQ 304 exceeds RSRQ threshold 310 and to false otherwise. In turn, the expression includes a first logical conjunction operator between the first and second comparisons and a second logical conjunction operator between the second and third comparisons, such that the expression evaluates to true if all three comparisons evaluate to true and to false otherwise.

Consequently, the estimate of signal condition 228 produced by comparisons 314 includes a binary or Boolean value that indicates whether the signal over the link is adequate for transmission. Continuing with the above example, values of CE parameter 302, RSRQ 304, and SINR 306 that result in the expression evaluating to true indicate that signal condition 228 is adequate for transmission of data from the electronic device over the link. Conversely, values of CE parameter 302, RSRQ 304, and SINR 306 that result in the expression evaluating to false indicate that signal condition 228 is not adequate for transmission of data from the electronic device over the link.

In one or more embodiments, CE parameter value 308, RSRQ threshold 310, and/or SINR threshold 312 are selected or adjusted to "identify" the cell edge associated with the link. For example, CE parameter value 308, RSRQ threshold 310, and/or SINR threshold 312 could be set for each combination of factors (e.g., cellular protocol, type of cellular modem, type of electronic device, etc.) that affects the transmission of data over a cellular link. Data rates, retry rates, and/or other indicators of wireless performance could be collected for different values of CE parameter 302, RSRQ 304, and/or SINR 306 sampled for a given combination of factors (e.g., values of CE parameter 302, RSRQ 304, and/or SINR 306 generated by a certain type of cellular modem according to a cellular protocol). CE parameter value 308, RSRQ threshold 310, and/or SINR threshold 312 could then be set to values of CE parameter 302, RSRQ 304, and/or SINR 306 that result in a specific data rate and/or retry rate and/or a given range of data rates and/or retry rates. In another example, CE parameter value 308, RSRQ threshold 310, and/or SINR threshold 312 could be selected to achieve a certain battery runtime in the electronic device, transmission of data over the link within a certain period from which the data was generated or sampled, and/or another goal related to cellular communication with the electronic device.

After signal condition 228 is estimated using comparisons 314, transmission decision 316 is made based on the estimated signal condition 228. If signal condition 228 is adequate (e.g., if the expression used to perform comparisons 314 evaluates to true), transmission decision 316 may include immediate transmission of data from the electronic device over the link. If signal condition is not adequate (e.g., if the expression used to perform comparisons 314 evaluates to false), transmission decision 316 may include delaying the transmission of data from the electronic device over the link. For example, transmission decision 316 could specify delaying the transmission of data over the link until the next point in time at which the electronic device is scheduled to transmit data over the link (e.g., after a predetermined period specified in a communication schedule associated with the electronic device). When the next point in time is reached, signal condition 228 could be re-evaluated using updated values of CE parameter 302, RSRQ 304, and SINR 306, and a new transmission decision 316 may be made based on the newly estimated signal condition 228. As a result, signal condition 228 may be estimated whenever the electronic device is scheduled to transmit data over the link, and a corresponding transmission decision 316 may be made so that the electronic device transmits data over the link to meet a certain data rate, likelihood of success, transmission deadline, and/or other goal or requirement represented by signal condition 228.

Because comparisons 314 involve computationally efficient evaluations that produce deterministic results, signal condition 228 may be estimated with minimal power consumption and/or computation time on the electronic device. The binary value representing signal condition 228 may similarly be used to generate a corresponding transmission decision 316 in a time- and/or power-efficient manner. Consequently, the technique of FIG. 3A improves power consumption and/or battery life on the electronic device by avoiding transmission attempts when signal condition 228 is not adequate and minimizing delay and/or overhead associated with transmitting data over the link when signal condition 228 is adequate.

While FIG. 3A illustrates the generation of transmission decision 316 based on CE parameter 302, RSRQ 304, and SINR 306, it will be appreciated that other parameters and/or thresholds may be used in comparisons 314 and/or to make transmission decision 316. For example, one or more comparisons 314 could be performed using values and/or thresholds for RSRP, Receive Signal Strength Indicator (RSSI), and/or other measurements of cellular signal strength, signal quality, and/or signal state supported by the cellular modem and/or cellular protocol used by the electronic device to send and receive data over the link. In another example, CE parameter 302, RSRQ 304, and/or SINR 306 could be compared with multiple values and/or thresholds, and the output of comparisons 314 may include a "rating" (e.g., from 1 to 5, from 1 to 10, from A to F, etc.) that represents signal condition 228.

Figure 3B:
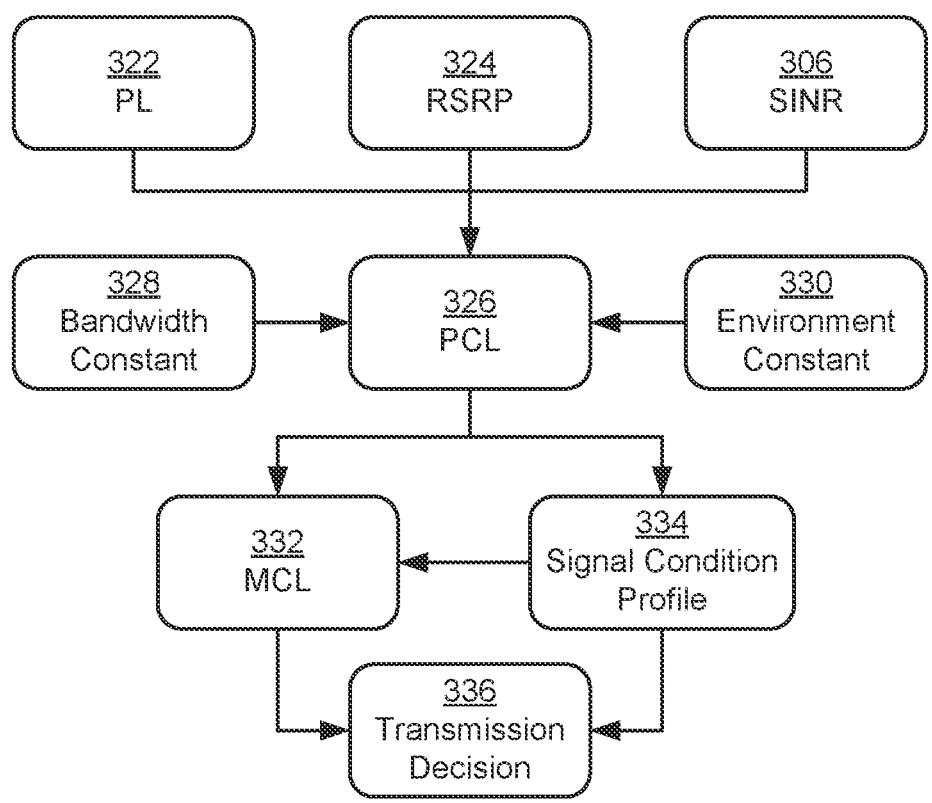
FIG. 3B illustrates the use of the radio frequency link parameters of FIG. 2 when making a transmission decision, according to various embodiments.

FIG. 3B illustrates the use of RF link parameters 226 of FIG. 2 in making a transmission decision 33, according to various embodiments. As mentioned above, RF link parameters 226 may be generated by a cellular modem on an electronic device (e.g., electronic device 112 of FIG. 1) independent of the cellular protocol used to establish a link with a base station (e.g., base station 118 of FIG. 1). For example, RF link parameters 226 could be included in link quality statistics produced by the cellular modem.

As shown in FIG. 3B, RF link parameters 226 include a PL 322, an RSRP 324, and SINR 306. PL 322, RSRP 324, and SINR 306 may be generated by the cellular modem according to a propagation model of a cellular signal from the base station to the electronic device.

PL 322, RSRP 324, and SINR 306 are combined with a bandwidth constant 328 and an environment constant 330 into an estimate of a pseudo-coupling loss (PCL) 326 representing a signal condition of the link. In one or more embodiments, PCL 326 is calculated using the following equation:

$$PCL_{uplink}(dB) = PL + RSRP - SINR - N_{figureENodeB} - N_{floor} \quad (2)$$

In the above equation, PCL 326 for the uplink from the electronic device to the base station is represented by $PCL_{uplink}(dB)$. In particular, PCL 326 is calculated as the sum of PL 322 from the electronic device to the base station, RSRP 324 as perceived by the cellular modem, the negative of SINR 306 as perceived by the cellular modem, the negative of bandwidth constant 328 as represented by $N_{figureENodeB}$, and the negative of environment constant 330 as represented by $N_{floor}$ from the result. Bandwidth constant 328 may be a noise figure that is relative to the bandwidth associated with the base station, and environment constant 330 may be a thermal noise floor defined by the environment around the electronic device and/or base station.

PCL 326 is compared with a maximum coupling loss (MCL) 332 associated with the link to generate transmission decision 336. In some embodiments, MCL 332 represents a threshold for PCL 326. MCL 332 may be defined for the electronic device, cellular protocol, base station, and/or another factor that affects transmission of data from the electronic device over the link. When MCL 332 is greater than or equal to PCL 326, the likelihood of success of data transmission over the link is adequate, and transmission decision 336 includes immediate transmission of data from the electronic device over the link. When MCL 332 is less than PCL 326, data transmission over the link is unlikely to succeed, and transmission decision 336 includes delaying the transmission of data from the electronic device over the link (e.g., until the next point in time specified in the communication schedule associated with the electronic device).

In one or more embodiments, the estimation of PCL 326 using Equation 1 is derived using the following. MCL 332 is calculated as the maximum conducted power loss that can be tolerated by the electronic device and/or base station. Values of MCL 332 may be calculated using the following:

$$MCL_{downlink} = P_{ENodeB} - (SINR_{RequiredBPD} + N_{figureBPD} + N_{floor}) \quad (3)$$

$$MCL_{uplink} = P_{BPD} - (SINR_{RequiedENodeB} + N_{figureENodeB} + N_{floor}) \quad (4)$$

In the above equations, both values of MCL 332 are calculated in dB. $MCL_{downlink}$ represents MCL 332 for the downlink from the base station to the electronic device, and $MCL_{uplink}$ represents MCL 332 for the uplink from the electronic device to the base station. $P_{ENodeB}$ and $P_{BPD}$ represent the transmission power of the base station and the electronic device, respectively. $SINR_{RequiredBPD}$ and $SINR_{RequiredENodeB}$ represent the required SINR 306 (e.g., the amount of noise tolerated) for the electronic device and base station, respectively. As mentioned above, $N_{floor}$ represents environment constant 330 and $N_{figureENodeB}$ represents bandwidth constant 328 for the base station, while $N_{figureBPD}$ represents bandwidth constant 328 (e.g., a bandwidth-dependent noise figure) for the electronic device.

Continuing with the above equations, SINR 306 for the base station may be estimated based on data available to the cellular modem on the electronic device. In particular, SINR 306 for the electronic device may be calculated using the following equation:

$$SINR_{BPD} = S_{BPD} - (N_{BPD} + I_{BPD}) \quad (5)$$

where $SINR_{BPD}$ is SINR 306 for the electronic device, $S_{BPD}$ is the power of usable signals measured by the electronic device, $N_{BPD}$ is the background noise detected by the electronic device, and $I_{BPD}$ is the average interference power detected by the electronic device. All values used in the above equation may be specified in decibels (dB).

Assuming $S_{BPD} = RSRP$ in decibels, then $N_{BPD} + I_{BPD} = RSRP - SINR_{BPD}$ when all values are in decibels. A lossy estimate of the noise and interference viewed from the base station is equivalent to the noise and interference viewed from the electronic device. Sources of errors associated with this estimate include the following:

- potentially higher noise and interference at the electronic device due to proximity to other transmitters (e.g., mobile phones, smart meters, etc.)
- potentially lower noise and interference at the electronic device due to location in a pit or obstructions between the electronic device and the base station
- potentially higher noise and interference at the base station due to a directional sectorized antenna
- potentially lower noise and interference at the base station due to PL distance from elements in the sector Because these factors are both additive and subtractive with respect to the noise and interference at the electronic device and base station, the observed noise and interference at the electronic device can be assumed to be close enough to the noise and interference at the base station to be used in an estimate of PCL 326.

More specifically, the above equation for calculating PCL 326 from PL 322, RSRP 324, SINR 306, bandwidth constant 328, and environment constant 330 may be derived by combining $N_{BPD} + I_{BPD} = RSRP - SINR_{BPD}$ with the equation for calculating the uplink MCL 332 into the following:

$$PCL_{uplink}(dB) = P_{BPD} - ((P_{BPD@BS} - (N_{BPD} + I_{BPD}) + N_{figureENodeB} + N_{floor}) \quad (6)$$

where $P_{BPD@BS}$ represents the received power of the electronic device at the base station. While this value is not available to the electronic device, the value can be calculated as the transmission power of the electronic device minus PL 322:

$$P_{BPD@BS}(dB) = P_{BPD} - PL \quad (7)$$

The calculation of PCL 326 may be updated using the above calculation of $P_{BPD@BS}$ to produce the following equation:

$$PCL_{uplink}(dB) = P_{BPD} - (((P_{BPD}-PL)-(N_{BPD}+I_{BPD})+ N_{figureENodeB}+N_{floor}) \quad (8)$$

The above equation may then be converted into Equation 2 by cancelling out the transmission power terms $P_{BPD}$ and replacing $N_{BPD}+I_{BPD}$ with $RSRP-SINR_{BPD}$.

As shown, a given estimate of PCL 326 may also be used to update a signal condition profile 334 associated with the link between the electronic device and base station. Signal condition profile 334 includes statistics and/or metrics related to PCL 326 values collected over one or more periods. For example, signal condition profile 334 could include a minimum, maximum, mean, median, quantile, standard deviation, variance, skew, kurtosis, and/or another statistic for a number of PCL 326 values. Signal condition profile 334 could also, or instead, track moving averages, trends, seasonality, and/or other patterns related to time series analysis of values of PCL 326. Signal condition profile 334 could also, or instead, include data rates, retry rates, and/or other indicators of transmission performance that are collected concurrently with values of PCL 326.

At each point in time at which transmission decision 336 is to be made, one or more PCL 326 values may be generated and compared with MCL 332 to make transmission decision 336. When transmission decision 336 triggers the transmission of data from the electronic device over the link, additional values of PCL 326 may periodically be computed (e.g., every five seconds) during the corresponding data session to further monitor the signal condition associated with the link over time. These values of PCL 326 may then be aggregated into one or more statistics and/or time series in signal condition profile 334. A separate signal condition profile 334 may be generated for each point in time at which a given transmission decision 336 is made (and optional subsequent data transmission is performed). Multiple signal condition profiles associated with multiple points in time and/or data sessions may optionally be aggregated into an "overall" signal condition profile 334 for the link. Consequently, signal condition profile 334 may characterize the quality, strength, and/or level of signal over the link across one or more time periods.

Signal condition profile 334 may additionally be used to update the value of MCL 332 to which PCL 326 is compared to make transmission decision 336. For example, MCL 332 may be set to a value of PCL 326 in signal condition profile 334 that is associated with a minimum data rate and/or a maximum retry rate. These updates to MCL 332 may be performed regularly (e.g., each time transmission decision 336 is to be made using signal condition profile 334 from a previous point in time) and/or in response to transmission errors and/or issues that occur after transmission decision 336 triggers one or more attempts to transmit the data over the link.

In some embodiments, the techniques for estimating signal condition 228 described above with respect to FIGS. 3A-3B may be used and/or combined in various ways to make transmission decisions 316 and/or 336. For example, an initial transmission decision 316 could be made using comparisons 314 of CE parameter 302, RSRQ 304, and SINR 306 with CE parameter value 308, RSRQ threshold 310, and SINR threshold 312, respectively. When transmission decision 316 triggers transmission of data from the electronic device over the link, values of PCL 326 are sampled and aggregated into signal condition profile 334 for the corresponding data session. In another example, transmission of data over the link could be performed or delayed based on a technique (e.g., one of the techniques illustrated in FIGS. 3A and 3B) that produces the most accurate estimate of signal condition 228 for a given cellular modem, electronic device, cellular protocol, and/or location.

Figure 4:
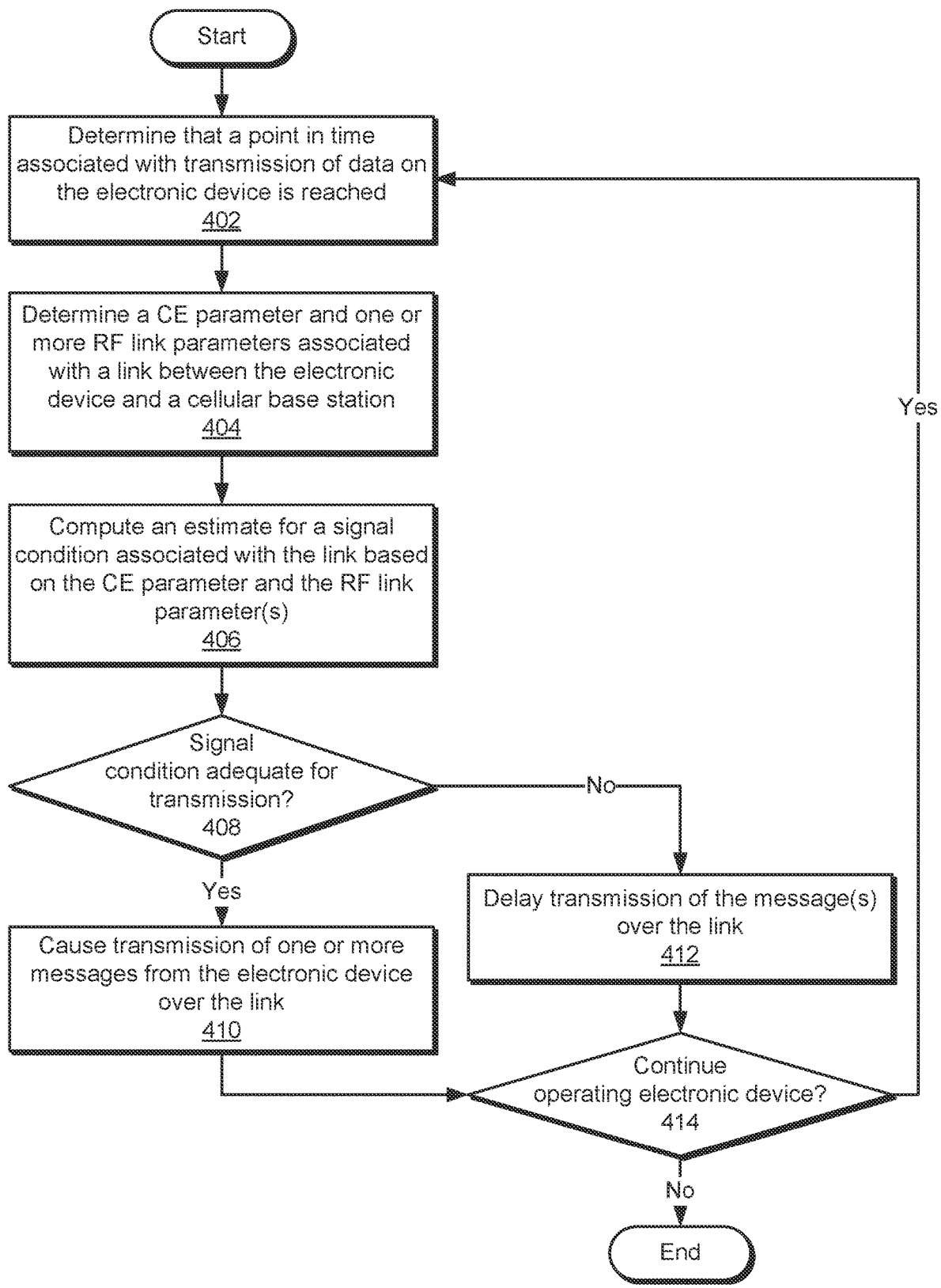
FIG. 4 is a flow chart of method steps for operating an electronic device within a cellular environment using cellular protocol information, according to various embodiments.

FIG. 4 is a flow chart of method steps for operating an electronic device within a cellular environment using cellular protocol information, according to various embodiments. Although the method steps are described in conjunction with the systems of FIGS. 1-2, persons skilled in the art will understand that any system configured to perform the method steps, in any order, is within the scope of the present invention.

As shown, software application 222 determines 402 that a point in time associated with transmission of data on the electronic device is reached. For example, software application 222 could determine that the current time represents a point in time at which metrology data and/or other data collected by the electronic device is to be transmitted to one or more servers 104. This point in time could be specified in a communication schedule for the electronic device and/or identified by software application 222 after an alert, notification, interrupt, condition, and/or another trigger to transmit data is detected by software application 222 and/or the electronic device.

Next, software application 222 determines 404 a CE parameter and one or more RF link parameters associated with a link between an electronic device and a cellular base station. The CE parameter may include a CE mode, CE level, and/or another indicator of the use of CE on the electronic device. The RF link parameter(s) may include (but are not limited to) a SINR and/or RSRQ.

Software application 222 also computes 406 an estimate for a signal condition associated with the link based on the CE parameter and the RF link parameters. For example, software application 222 may compare the CE parameter to one or more predetermined CE levels, CE modes, and/or other values related to CE on the electronic device. Software application 222 may also compare the SINR and/or RSRQ in the RF link parameter(s) with one or more corresponding thresholds. Software application 222 may then apply one or more logical operators (e.g., conjunction, disjunction, exclusive disjunction, negation, biconditional, alternative denial, etc.) to binary values computed as results of the comparisons to generate a true or false value representing the estimate of the signal condition.

Software application 222 performs additional processing based on a determination 408 of whether or not the signal condition is adequate for transmission. Continuing with the above example, software application 222 could determine that the signal condition is adequate when the comparisons and/or evaluations performed operation 406 result in a true value for the estimate. Conversely, software application 222 could determine that the signal condition is not adequate when the comparisons and/or evaluations performed in operation 406 result in a false value for the estimate.

When the signal condition is determined to be adequate for transmission, software application 222 causes 410 transmission of one or more messages from the electronic device over the link. For example, software application 222 could generate one or more messages that include data to be transmitted to one or more servers 104 and/or one or more commands for transmitting the message(s) to the servers. Software application 222 and/or another component on the electronic device could then perform one or more operations that use the cellular modem on the electronic device to transmit the message(s) over the link to the cellular base station. After the message(s) are successfully transmitted, the component could place the cellular modem in a low-power "sleep" mode to conserve battery power on the electronic device.

When the signal condition is determined to not be adequate for transmission, software application 222 delays 412 transmission of the message(s) over the link. For example, software application 222 could generate one or more commands that cause the cellular modem to disconnect with the base station and go into the low-power mode. Software application 222 could also, or instead, reschedule transmission of the message(s) for a subsequent point in time (e.g., the next point in time associated with transmission of data from the electronic device).

Software application 222 may continue 414 operating the electronic device using operations 402-412. For example, software application 222 could use operations 402-412 to periodically and/or repeatedly estimate the signal condition, make a transmission decision based on the signal condition, and implement the transmission decision while the electronic device is used to generate and/or collect data that is transmitted over a cellular link to one or more servers 104.

Figure 5:
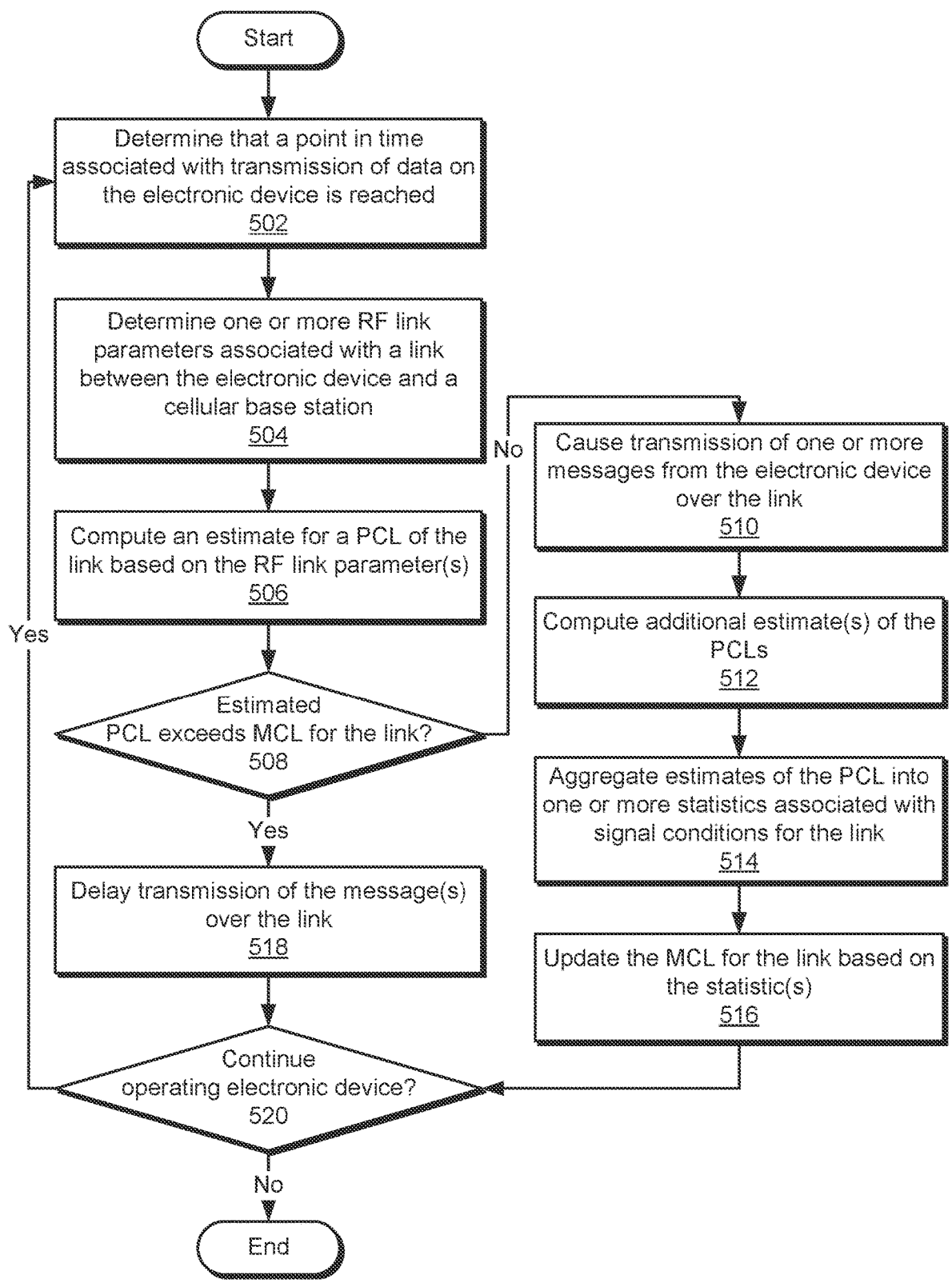
FIG. 5 is a flow chart of method steps for operating an electronic device within a cellular environment using RF link information, according to various embodiments.

FIG. 5 is a flow chart of method steps for operating an electronic device within a cellular environment using RF link information, according to various embodiments. Although the method steps are described in conjunction with the systems of FIGS. 1-2, persons skilled in the art will understand that any system configured to perform the method steps, in any order, is within the scope of the present invention.

As shown, software application 222 determines 502 that a point in time associated with transmission of data on the electronic device is reached. For example, software application 222 could determine that the current time represents a point in time at which metrology data and/or other data collected by the electronic device is to be transmitted to one or more servers 104. This point in time could be specified in a communication schedule for the electronic device and/or identified by software application 222 after an alert, notification, interrupt, condition, and/or another trigger to transmit data is detected by software application 222 and/or the electronic device.

Next, software application 222 determines 504 one or more RF link parameters associated with a link between an electronic device and a cellular base station. The RF link parameter(s) may include, but are not limited to, a PL, RSRP, and/or SINR.

Software application 222 also computes 506 an estimate for a PCL of the link based on the RF link parameter(s). For example, software application 222 could input the PL, the RSRP, the SINR, a thermal noise floor, and/or a noise figure associated with the cellular base station into an equation that performs additions, subtractions, and/or other arithmetic operations using the input. Software application 222 could then obtain the PCL as output of the equation. The PCL may include a numeric value that represents the likelihood of transmitting data over the link, given the signal associated with the link.

Software application 222 performs additional processing based on a determination 508 of whether or not the estimated PCL exceeds an MCL for the link. The MCL may be represent a threshold for the coupling loss of the link. If the threshold is exceeded by the estimated PCL, the signal condition represented by the estimated PCL is not adequate for transmission of data over the link. If the threshold is not exceeded by the estimated PCL, the signal condition represented by the estimated PCL is adequate for transmission of data over the link.

When the estimated PCL does not exceed the MCL for the link, software application 222 causes 510 transmission of one or more messages from the electronic device over the link. For example, software application 222 could generate one or more messages that include data to be transmitted to one or more servers 104 and/or one or more commands for transmitting the message(s) to the servers. Software application 222 and/or another component on the electronic device could then perform one or more operations that use the cellular modem on the electronic device to transmit the message(s) over the link to the cellular base station. After the message(s) are successfully transmitted, software application 222 and/or another component on the electronic device could place the cellular modem in a low-power "sleep" mode to conserve battery power on the electronic device.

During transmission of the message(s) over the link, software application 222 computes 512 one or more additional estimates of the PCL and aggregates 514 estimates of the PCL into one or more statistics associated with signal conditions for the link. For example, software application 222 could calculate a mean, median, maximum, minimum, quantile, standard deviation, variance, skew, kurtosis, and/or another statistic related to PCL values calculated in operations 506 and 512. Software application 222 could also, or instead, record the PCL values with timestamps for the times at which the PCL values were determined and/or determine trends, seasonality, moving averages, and/or other patterns related to the PCL values and timestamps.

Software application 222 optionally updates 516 the MCL for the link based on the statistic(s). For example, software application 222 could set the MCL to the highest PCL value that allows for successful transmission of the data over the link and/or transmission of the data at a minimum data rate. Software application 222 may omit operation 516 if the data transmission over the link is successful and the PCL for the link remains below the MCL during the data transmission.

When the signal condition is determined to not be adequate for transmission, software application 222 delays 518 transmission of the message(s) over the link. For example, software application 222 could generate one or more commands that cause the cellular modem to disconnect with the base station and go into the low-power mode. Software application 222 could also, or instead, reschedule transmission of the message(s) for a subsequent point in time (e.g., the next point in time associated with transmission of data from the electronic device).

Software application 222 may continue 520 operating the electronic device using operations 502-518. For example, software application 222 could use operations 502-518 to periodically and/or repeatedly estimate the signal condition, make a transmission decision based on the signal condition, and implement the transmission decision while the electronic device is used to generate and/or collect data that is transmitted over a cellular link to one or more servers 104.

Software application 222 may also operate the electronic device using various subsets, permutations, and/or repetitions of method steps from the flow charts of FIGS. 4 and 5. For example, software application 222 could perform operations 402-408 to efficiently determine if the signal condition associated with the link is sufficient to transmit data at a given point in time. Software application 222 could perform operations 502-508 before, after, and/or in lieu of operations 402-408 to perform a different and/or additional assessment of the signal condition. If the signal condition is determined to be adequate (e.g., if the estimate computed in operation 406 is true and/or the PCL computed in operation 506 does not exceed the MCL for the link), software application 222 may trigger the transmission of data over the link. During the data transmission, software application 222 may optionally use updated values of the CE and/or RF link parameters to further assess the signal condition associated with the link, generate statistics associated with the signal condition, and/or adjust one or more thresholds (e.g., SINR threshold, RSRQ threshold, MCL, etc.) used to estimate the signal condition and/or make transmission decisions based on the signal condition. As signal conditions are collected and aggregated over time, software application 222 may adjust estimates of signal conditions and/or the corresponding transmission decisions to balance the timeliness of data transmission over the link with the likelihood of success of the data transmission over the link.

In sum, CE parameters and/or RF link parameters provided by the cellular modem on an electronic device are used with various techniques to control the transmission of data from the electronic device to a cellular base station via a link with the cellular base station. The CE parameter includes a CE level, CE mode, and/or another indicator of the use of CE on the electronic device. The RF parameters include a SINR, RSRQ, RSRP, PL, RSSI, and/or other measurements that characterize the signal strength, signal quality, and/or other attributes of the signal associated with the link. One technique performs computationally efficient comparisons and/or evaluations using a CE parameter and one or more RF link parameters to estimate the signal condition associated with the link as a binary true/false value. Another technique inputs one or more RF link parameters and/or constants into an equation and obtains, as output from the equation, a numeric value representing the signal condition. When the signal condition is determined to be adequate (e.g., when the binary value is set to true and/or the numeric value meets a threshold), transmission of data over the link is triggered. When the signal condition is determined to not be adequate (e.g., when the binary value is set to false and/or the numeric value does not meet a threshold), transmission of data over the link is delayed. Consequently, the disclosed techniques efficiently detect poor signal conditions and delay transmission of data over the link until the signal conditions improve.

One technical advantage of the disclosed techniques relative to the prior art is that the disclosed techniques, when implemented in battery-powered network devices, enable relatively higher success rates and/or reduced retry rates when transmitting data over cellular links. Accordingly, the disclosed techniques enable battery-powered devices to reduce overall power consumption relative to what can be achieved using prior art approaches, thereby extending overall battery life. In addition, the disclosed techniques reduce overall computational overhead and result in overall higher data rates in cellular communications. These technical advantages provide one or more technological improvements over prior art approaches.

1. In some embodiments, a method for operating an electronic device within a cellular environment comprises determining a coverage enhancement (CE) parameter and one or more radio frequency (RF) link parameters associated with a link between the electronic device and a cellular base station at a first point in time; computing a first estimate for a signal condition associated with the link based on the CE parameter and the one or more RF link parameters; determining that the signal condition is not adequate based on the first estimate; and delaying transmission of one or more messages from the electronic device over the link until a second point in time that is later than the first point in time.

2. The method of clause 1, further comprising determining updated values for the CE parameter and the one or more RF link parameters at the second point in time; computing a second estimate for the signal condition associated with the link based on the updated values; determining that the signal condition is adequate based on the second estimate; and causing the one or more messages to be transmitted from the electronic device over the link.

3. The method of any of clauses 1-2, further comprising during transmission of the one or more messages over the link, computing one or more estimates of a pseudo-coupling loss (PCL) for the link based on one or more additional RF link parameters associated with the link; and aggregating the one or more estimates of the PCL to generate one or more statistics that characterize the signal condition associated with the link.

4. The method of any of clauses 1-3, further comprising updating a maximum coupling loss (MCL) for the link based on the one or more statistics.

5. The method of any of clauses 1-4, wherein the one or more additional RF link parameters comprise at least one of a path loss (PL), a Reference Signal Received Power (RSRP), or a Signal to Interference and Noise Ratio (SINR).

6. The method of any of clauses 1-5, wherein computing the first estimate for the signal condition associated with the link comprises computing a binary value based on a comparison of the CE parameter with a predetermined CE parameter value.

7. The method of any of clauses 1-6, wherein computing the first estimate for the signal condition associated with the link comprises computing a binary value based on a comparison of a SINR included in the one or more RF link parameters with a threshold.

8. The method of any of clauses 1-7, wherein computing the first estimate for the signal condition associated with the link comprises computing a binary value based on a comparison of a Reference Signal Received Quality (RSRQ) included in the one or more RF link parameters to a threshold.

9. The method of any of clauses 1-8, wherein determining that the signal condition is not adequate comprises at least one of determining that the CE parameter does not match a predetermined CE parameter value, determining that a SINR included in the one or more RF link parameters does not meet a first threshold, or determining that a RSRQ included in the one or more RF link parameters that not meet a second threshold.

10. The method of any of clauses 1-9, wherein the second point in time is a predetermined period of time after the first point in time.

11. The method of any of clauses 1-10, wherein delaying the transmission of the one or more messages over the link until the second point in time comprises placing a cellular modem that is included in the electronic device into a low-power mode until the second point in time.

12. In some embodiments, a non-transitory computer readable medium stores instructions that, when executed by a processor, cause the processor to perform the steps of determining a coverage enhancement (CE) parameter and one or more radio frequency (RF) link parameters associated with a link between the electronic device and a cellular base station at a first point in time; computing a first estimate for a signal condition associated with the link based on the CE parameter and the one or more RF link parameters; determining that the signal condition is not adequate based on the first estimate; and delaying transmission of one or more messages from the electronic device over the link until a second point in time that is later than the first point in time.

13. The non-transitory computer readable medium of clause 12, wherein the instructions further cause the processor to perform the steps of determining updated values for the CE parameter and the one or more RF link parameters at the second point in time; computing a second estimate for the signal condition associated with the link based on the updated values; determining that the signal condition is adequate based on the second estimate; and causing the one or more messages to be transmitted from the electronic device over the link.

14. The non-transitory computer readable medium of any of clauses 12-13, wherein the instructions further cause the processor to perform the steps of computing one or more estimates of a pseudo-coupling loss (PCL) for the link based on one or more additional RF link parameters associated with the link; aggregating the one or more estimates of the PCL to generate one or more statistics that characterize the signal condition associated with the link; and updating a maximum coupling loss (MCL) for the link based on the one or more statistics.

15. The non-transitory computer readable medium of any of clauses 12-14, wherein the one or more additional RF link parameters comprise at least one of a path loss (PL), a Reference Signal Received Power (RSRP), or a Signal to Interference and Noise Ratio (SINR).

16. The non-transitory computer readable medium of any of clauses 12-15, wherein computing the first estimate for the signal condition associated with the link comprises computing a first binary value based on a first comparison of the CE parameter with a predetermined CE parameter value; computing a second binary value based on a second comparison of a SINR included in the one or more RF link parameters to a threshold; and computing a third binary value based on a third comparison of a Reference Signal Received Quality (RSRQ) included in the one or more RF link parameters to a threshold.

17. The non-transitory computer readable medium of any of clauses 12-16, wherein computing the first estimate for the signal condition associated with the link further comprises applying one or more logical operators to the first binary value, the second binary value, and the third binary value to generate the first estimate for the signal condition.

18. The non-transitory computer readable medium of any of clauses 12-17, wherein computing the first estimate for the signal condition associated with the link further comprises computing a first logical conjunction of the first binary value and the second binary value; and computing a second logical conjunction of the second binary value and the third binary value.

19. The non-transitory computer readable medium of any of clauses 12-18, wherein delaying the transmission of the one or more messages over the link until the second point in time comprises placing a cellular modem that is included in the electronic device into a low-power mode until the second point in time.

20. In some embodiments, a system comprises a memory that stores instructions, and a processor that is coupled to the memory and, when executing the instructions, is configured to determine a coverage enhancement (CE) parameter and one or more radio frequency (RF) link parameters associated with a link between the electronic device and a cellular base station at a first point in time; compute a first estimate for a signal condition associated with the link based on the CE parameter and the one or more RF link parameters; determine that the signal condition is not adequate based on the first estimate; and delay transmission of one or more messages from the electronic device over the link until a second point in time that is later than the first point in time.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   determining, by an electronic device, a coverage enhancement (CE) parameter associated with a link between the electronic device and a base station for a first point in time;
   determining, by the electronic device, a signaling metric threshold based on at least one of a communication protocol used by the electronic device, a type of modem included in the electronic device that is used to establish the link, or a type of the electronic device;
   determining, by the electronic device and based on the CE parameter, that a signaling metric associated with the link for the first point in time is equal to or below the signaling metric threshold; and
   in response to determining that the signaling metric is equal to or below the signaling metric threshold, placing the modem into a lower-power mode until a second point in time that is later than the first point in time.

2. The method of claim 1, wherein the CE parameter is a CE mode or a CE level employed by the electronic device.

3. The method of claim 1, wherein the CE parameter indicates an amount of coverage enhancement used by the electronic device.

4. The method of claim 1, wherein the signaling metric is selected from a group consisting of a Reference Signal Received Power (RSRP), a Signal to Interference and Noise Ratio (SINR), a path loss (PL), and a Receive Signal Strength Indicator (RSSI).

5. The method of claim 1, further comprising:
   estimating, by the electronic device, a signal condition for the link based on at least the CE parameter and the signaling metric; and
   in response to determining that the signal condition indicates that the electronic device is outside a cell edge for the base station, delaying, by the electronic device, transmission of one or more messages from the electronic device over the link until the second point in time.

6. The method of claim 1, wherein the first point in time corresponds to a time when the electronic device is scheduled to transmit one or more messages.

7. The method of claim 1, wherein the second point in time is a period of time after the first point in time, wherein the period of time is defined in a communication schedule that was previously received by the electronic device.

8. The method of claim 1, wherein the lower-power mode is a sleep mode.

9. A network device comprising:
   one or more processors; and
   a memory storing instructions that when executed by the one or more processors causes the network device to perform operations comprising:
      identifying a first coverage enhancement (CE) parameter for use at a first point in time when communicating via a link between the network device and a second network device;
      setting a first threshold value based on at least one of a communication protocol used for the link, a type of a modem included in the network device that is used to establish the link, or a type of the network device;
      comparing, based on the first CE parameter, a first value of a radio frequency (RF) parameter associated with link for the first point in time to the first threshold value; and
      in response to determining that the first value of the RF parameter for the first point in time is not above the first threshold value, placing the modem into a lower-power mode until a second point in time, the second point in time being after the first point in time.

10. The network device of claim 9, wherein the CE parameter is a CE mode, a CE level employed by the network device, or an amount of coverage enhancement used when sending information using the link.

11. The network device of claim 9, wherein the RF parameter is selected from a group consisting of a Reference Signal Received Power (RSRP), a Signal to Interference and Noise Ratio (SINR), a path loss (PL), and a Receive Signal Strength Indicator (RSSI).

12. The network device of claim 9, wherein the second point in time is a next point in time when the network device is scheduled to send information to the second network device.

13. The network device of claim 9, wherein the operations further comprise:
   determining a second CE parameter for use at the second point in time when communicating via the link between the network device and the second network device;
   comparing, based on the second CE parameter, a second value of the RF parameter associated with the link for the second point in time to a second threshold value; and
   in response to determining that the second value of the RF parameter is above the second threshold value, sending information to the second network device using the link beginning at the second point in time.

14. A non-transitory computer readable medium storing instructions that, when executed by a cellular device, cause the cellular device to perform operations comprising:
   determining a coverage enhancement (CE) parameter associated with a link used to couple the cellular device to a cellular network at a first point in time;

determining a plurality of thresholds based on at least one of a communication protocol used by the cellular device, a type of modem included in the cellular device, or a type of the cellular device;

comparing, based on the CE parameter, respective signaling statistics of a plurality of signaling statistics associated with the link to respective thresholds in the plurality of thresholds; and in response to determining that a first signaling statistic of the plurality of signaling statistics is at or below a first respective threshold of the plurality of thresholds, placing the modem into a lower-power mode until a second point in time that is after the first point in time.

15. The non-transitory computer readable medium of claim 14, wherein the CE parameter is a CE mode, a CE level employed by the cellular device, or indicates use of coverage enhancement by the cellular device.

16. The non-transitory computer readable medium of claim 14, wherein the first signaling statistic is selected from a group consisting of a Reference Signal Received Power (RSRP), a Signal to Interference and Noise Ratio (SINR), a path loss (PL), and a Receive Signal Strength Indicator (RSSI).

17. The non-transitory computer readable medium of claim 14, wherein the first point in time corresponds to a time when the cellular device is scheduled to transmit data.

18. The non-transitory computer readable medium of claim 16, wherein the operations further comprise in response to determining that the respective signaling statistics are above the respective thresholds, begin transmitting data using the link at the first point in time.

* * * * *